United States Patent [19]

Rohde

[11] Patent Number: 4,726,243
[45] Date of Patent: Feb. 23, 1988

[54] CONTINUOUSLY VARIABLE TRANSMISSION

[75] Inventor: Steve M. Rohde, Utica, Mich.

[73] Assignee: General Motors Corporation, Detroit, Mich.

[21] Appl. No.: 882,848

[22] Filed: Jul. 7, 1986

[51] Int. Cl.⁴ ............................................. F16H 15/50
[52] U.S. Cl. ........................................ 74/190; 74/198;
74/216
[58] Field of Search .................... 74/190, 190.5, 198,
74/216; 474/51

[56] References Cited
U.S. PATENT DOCUMENTS
3,048,048  8/1962  Weston ................................ 474/51

FOREIGN PATENT DOCUMENTS
576745  5/1933  Fed. Rep. of Germany ........ 74/190

Primary Examiner—Lawrence J. Staab
Attorney, Agent, or Firm—Donald F. Scherer

[57] ABSTRACT

A continuously variable friction drive transmission has expandable fluid housing members on both the input shaft and the output shaft. The housing members are in fluid communication with a control valve which is operable to establish the fluid pressures in the housings. The housings are maintained in frictional engagement by the internal fluid pressure such that power can be transmitted between the shafts. The drive ratio between the shafts is determined by the internal pressures of the housings which establish the outer diameters thereof. The drive ratio is changed by changing one or both of the internal fluid pressures.

2 Claims, 2 Drawing Figures

CONTINUOUSLY VARIABLE TRANSMISSION

BACKGROUND OF THE INVENTION

This invention relates to continuously variable drive transmissions and more particularly to such transmissions incorporating a frictional drive connection between the input and output members.

SUMMARY OF THE INVENTION

It is an object of this invention to provide an improved continuously variable ratio transmission having expandable fluid housings on the transmission input and output members wherein the housings are in frictional drive engagement and wherein the internal pressure of the housings is controlled to effect a variable drive ratio range between the input and output members.

It is another object of this invention to provide an improved continuously variable ratio transmission having an input member and an output member with a flexible, expandable housing disposed on each member wherein the housings each have a substantially cylindrical portion disposed in frictional engagement and wherein the housings have a controlled internal pressure operable to establish the diameters of the cylindrical portions to thereby control the drive ratio between the input and output members.

These and other objects and advantages of the present invention will be more apparent from the following specification and drawings.

Figure 1:
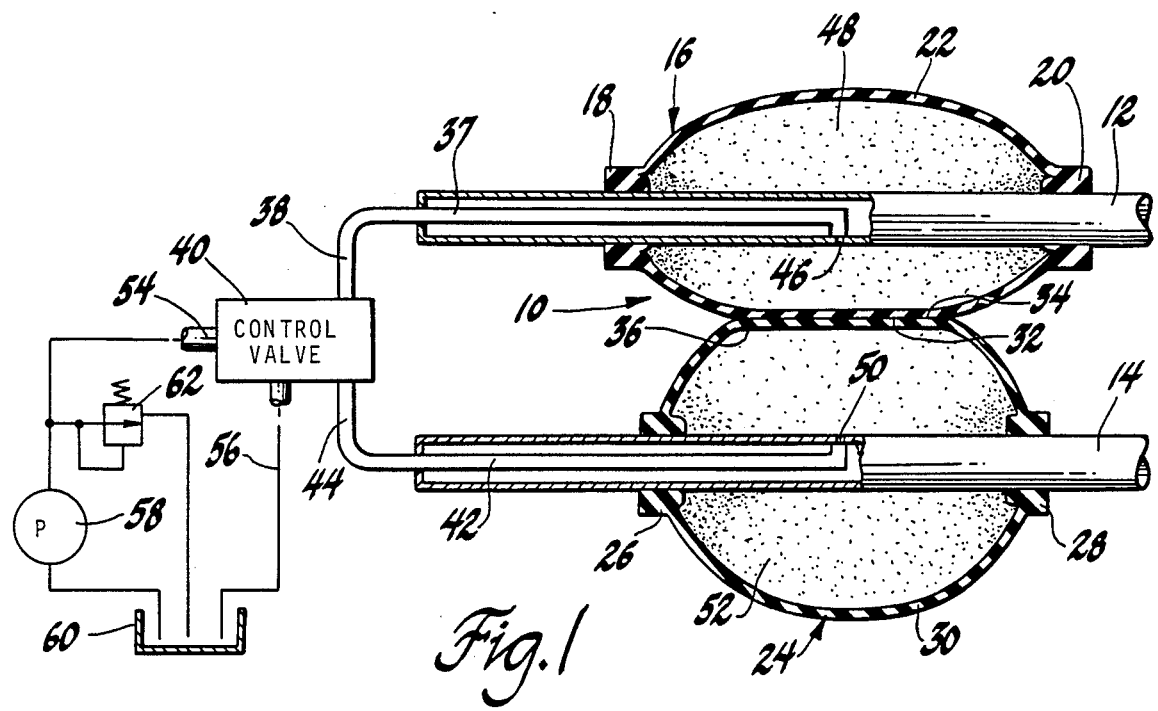
FIG. 1 is a diagrammatic representation of a transmission incorporating the present invention.

Referring to the drawings, wherein like characters represent the same or corresponding parts throughout the several views, there is seen in FIG. 1 a variable ratio transmission 10 having an input shaft 12 adapted to be connected to a prime mover, not shown, and an output shaft 14 adapted to deliver power to the drive wheels of a vehicle, not shown. The input shaft 12 has slidably disposed thereon a flexible, expandable housing 16. The housing 16 has sealing hubs 18 and 20 and a central portion 22.

The output shaft 14 has slidably disposed thereon a flexible, expandable housing 24 which includes a pair of sealing hubs 26 and 28 and a central body portion 30. The central body portion 30 of housing 24 and the central housing portion 22 of housing 16 are disposed in frictional engagement at 32. The central portions 22 and 30 form substantially cylindrical sections 34 and 36, respectively, in the area of frictional engagement 32. In the alternative, these housings 16 and 24 can be secured to the respective shafts 12 and 14 at the hubs 18, 20, 26 and 28.

The input shaft 12 has a centrally located axially disposed passage 37 which is connected via a passage 38 to a control valve 40. The output shaft 14 has a centrally located axially disposed passage 42 which is in fluid communication with the control valve 40 through a passage 44. The passage 37 is in fluid communication through an opening 46 in shaft 12 with the internal area 48 of housing 16. The passage 42 is in fluid communication through an opening 50 in shaft 14 such that fluid communication is available to the interior 52 of housing 24.

The control valve 40 has an input passage 54 and an exhaust passage 56 which are in fluid communication with a hydraulic pump 58 and a reservoir 60, respectively. The hydraulic pump 58 is also in fluid communication with a conventional pressure regulator valve 62 which limits the maximum output pressure of the pump 58. The control valve 40 is a conventional control valve which may be manipulated pneumatically, mechanically, or electrically with any of the well-known control mechanisms. The control valve 40 can, for instance, provide a substantially fixed pressure within the housing 16 or 24 and vary the pressure within the housing 16 or 24 in response to vehicle operating parameters such as vehicle throttle settings. In the alternative, the pressures within both housings 16 and 24 can be controlled in response to various operating parameters such as torque demand, throttle position, engine speed and vehicle speed.

Figure 2:
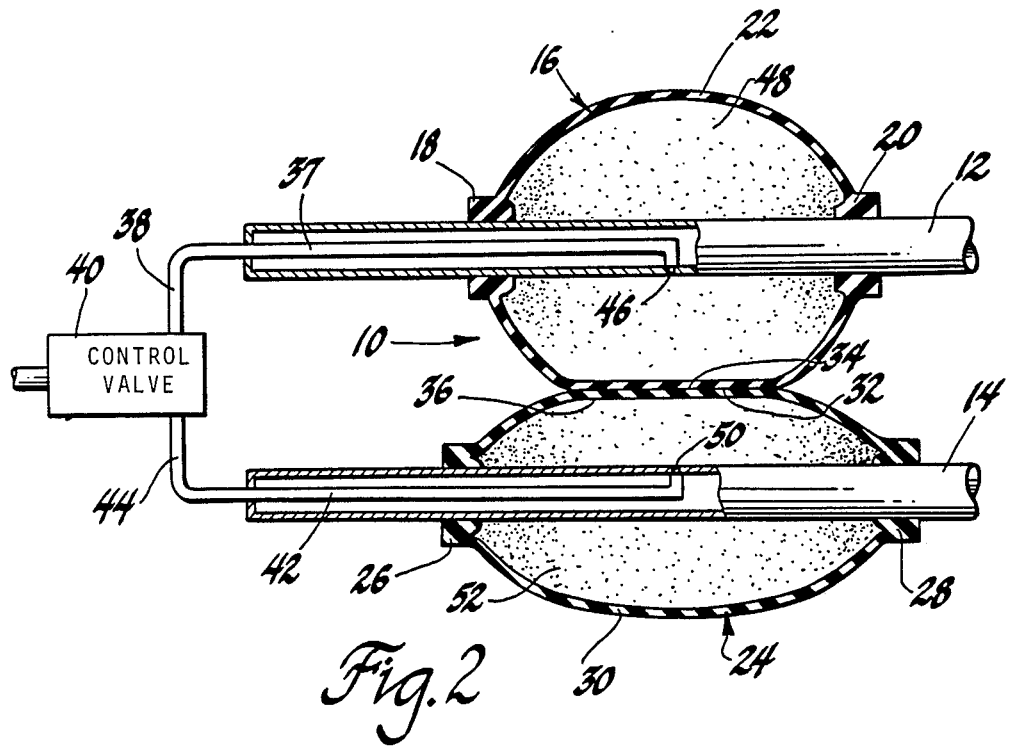
FIG. 2 is a view similar to FIG. 1 showing the transmission at a different operating ratio.

The internal pressures of housings 16 and 24 can be adjusted such that the external dimension of central portion 22 of housing 16 is expanded while the central portion 30 of housing 24 is contracted resulting in the relative positions shown in FIG. 2. During the expansion of housing 16, the sealing hubs 18 and 20 are permitted to slide on the input shaft 12. These sealing hubs are operable to prevent fluid leakage from the inside of housing 16 to the atmosphere.

In a similar manner, the sealing hubs 26 and 28 of housing 24 are slidable on the output shaft 14 to permit the contraction of housing 24 while retaining the fluid integrity of the housing 24. The hubs 18, 20, 26 and 28 are slidably disposed on the shafts 12 and 14, these hubs are, however, secured for rotation with their respective shafts. Thus, the rotary energy imparted to shaft 12 from a prime mover, is transmitted through housings 16 and 24 to the shaft 14. The speed and torque relationships between the shafts 12 and 14 is determined by the respective outer diameters of the cylindrical sections 34 and 36 where they are in frictional engagement at 32.

The disposition of the housings 16 and 24 shown in FIG. 1 will provide for a high torque ratio and low speed ratio from shaft 12 to shaft 14 while the disposition of the housings 16 and 24, as seen in FIG. 2, will provide a high speed ratio and low torque ratio from the shaft 12 to the shaft 14. In other words, the arrangement shown in FIG. 1 provides what is normally termed a low drive ratio or an underdrive while the configuration shown in FIG. 2 describes a high drive ratio or an overdrive.

It should be obvious from the above description, that the ratios can be continuously variable between these two extreme positions. If desired, the engine or prime mover can be operated at a constant speed and the speed and torque available at output shaft 14 is controlled by manipulation of the drive ratio between the housings 16 and 24. This, of course, is the normal operating procedure for a continuously variable transmission. It is, however, possible to utilize the variable input speed of an internal combustion engine or electric motor to provide a wider range of operation for a given vehicle.

The change in drive ratio from the underdrive shown in FIG. 1 to the overdrive shown in FIG. 2 can be accomplished by maintaining the pressure in housing 24 at a constant level while increasing the pressure in housing 16. Conversely, the pressure in housing 16 could be maintained at a fixed level while the pressure in housing 24 is decreased. Both of these situations would provide for the controlled drive ratio between the housings. It is also possible to provide a more sophisticated control system wherein the internal pressure of both housings 16 and 24 is varied. This type of a system permits the transmission to be conditioned for variable torque levels. If the required torque levels are high, the pressure of both housings can be increased and vice versa. The different pressures between the housings will establish the drive ratio at which the transmission operates. Obviously, a wide range of control mechanisms can be utilized to accomplish the desired variable drive ratio.

The embodiments of the invention in which an exclusive property or privilege is claimed are defined as follows:

1. A continuously variable ratio transmission comprising; a source of fluid pressure; transmission input shaft means; transmission output shaft means; first flexible fluid housing means rotatable with said input shaft means; second flexible fluid housing means rotatable with said output shaft means and frictionally engaging said first fluid housing means; and means for operatively connecting both said flexible housing means with said source of fluid pressure to control the pressure in both said fluid housing means, said fluid housing means being radially expandable and contractible in opposition to each other in response to fluid pressure to change the drive ratio between the input shaft means and the output shaft means.

2. A continuously variable ratio transmission comprising; a source of fluid pressure; transmission input shaft means; transmission output shaft means; first flexible fluid housing means rotatable with said input shaft means; second flexible fluid housing means rotatable with said output shaft means and frictionally engaging said first fluid housing means; each housing means having a pair of seal hub means slidably disposed on the respective shaft means and being rotatably secured thereto, and a central portion disposed between the respective hub means; and means for operatively connecting both said flexible housing means with said source of fluid pressure to control the pressure in both said fluid housing means, said central portions of said fluid housing means being radially expandable and contractible in opposition to each other in response to fluid pressure to change the drive ratio between the input shaft means and the output shaft means and said hub means sliding on said respective shaft means to accommodate said central portion movement while maintaining the fluid integrity of the housing means relative to the respective shaft means.

* * * * *